(12) United States Patent
Hoppe et al.

(10) Patent No.: US 7,481,276 B2
(45) Date of Patent: Jan. 27, 2009

(54) METHOD OF INHIBITING AND/OR PREVENTING CORROSION IN OILFIELD TREATMENT APPLICATIONS

(75) Inventors: Ronald L. Hoppe, Alberta (CA); Richard L. Martin, Pinehurst, TX (US); Marek K. Pakulski, The Woodlands, TX (US); Thame D. Schaffer, Carstairs (CA)

(73) Assignee: BJ Services Company, Houston, TX (US)

( * ) Notice: Subject to any disclaimer, the term of this patent is extended or adjusted under 35 U.S.C. 154(b) by 257 days.

(21) Appl. No.: 11/433,380

(22) Filed: May 12, 2006

(65) Prior Publication Data

US 2007/0261853 A1    Nov. 15, 2007

(51) Int. Cl.
*E21B 41/02* (2006.01)
*E21B 43/26* (2006.01)
*E21B 43/27* (2006.01)
*C09K 8/54* (2006.01)

(52) U.S. Cl. .............. 166/307; 166/308.2; 166/308.3; 166/310; 166/902; 507/90; 507/244; 507/246; 507/251; 507/934; 507/939

(58) Field of Classification Search ............... 507/246, 507/251, 90, 244, 934, 939; 166/307, 308.2, 166/308.3, 310, 371, 902
See application file for complete search history.

(56) References Cited

U.S. PATENT DOCUMENTS

| | | | | |
|---|---|---|---|---|
| 2,470,831 A | * | 5/1949 | Monson | 507/244 |
| 2,882,171 A | * | 4/1959 | Denman | 106/14.13 |
| 2,888,458 A | * | 9/1959 | Stromberg | 548/348.1 |
| 2,902,447 A | * | 9/1959 | Gunderson et al. | 507/244 |
| 2,914,557 A | * | 11/1959 | Oxford, Jr. | 562/511 |
| 3,113,113 A | * | 12/1963 | Marsh et al. | 252/392 |
| 3,114,702 A | * | 12/1963 | Thompson | 208/348 |
| 3,404,165 A | * | 10/1968 | Budde, Jr. et al. | 554/105 |
| 4,499,006 A | * | 2/1985 | Valone et al. | 252/392 |
| 5,154,857 A | * | 10/1992 | Durrieu et al. | 516/113 |
| 5,275,794 A | * | 1/1994 | Luna | 423/190 |
| 5,741,758 A | | 4/1998 | Pakulski | |
| 6,025,302 A | | 2/2000 | Pakulski | |
| 6,331,508 B1 | * | 12/2001 | Pakulski | 507/90 |
| 2004/0163307 A1 | | 8/2004 | Dahlmann et al. | |
| 2004/0164278 A1 | | 8/2004 | Dahlmann et al. | |
| 2004/0167040 A1 | | 8/2004 | Dahlmann et al. | |
| 2005/0101495 A1 | | 5/2005 | Dahlmann et al. | |

OTHER PUBLICATIONS

Martin, R.L.; "Inhibition of Vapor Phase Corrosion in Gas Pipelines;" Corrosion 97; 1997; pp. 1-8; Paper No. 337; NACE International Conference Division; Houston, TX.
Siegmund, G., et al; "Corrosivity of Methanolic Systems in Wet Sour Gas Production;" Corrosion 2000; 2000; pp. 1-11; Paper No. 00163; NACE International Conference Division; Houston, TX.
Tomson, Mason B. et al; "Inhibition of Barite Scale in the Presence of Hydrate Inhibitors"; 6th International Symposium on Oilfield Scale, Aberdeen, UK; May 26-27, 2004; pp. 1-12; SPE 87437; Society of Petroleum Engineers Inc., 2003.
Thieu, V., et al; "Use of Low-Dosage Hydrate Inhibitors in Sour Systems"; 2005 SPE International Symposium on Oilfield Chemistry; Houston, TX; Feb. 2005; pp. 1-7; SPE 93450; Society of Petroleum Engineers Inc., 2005.
BJ Chemical Services; "TECHNI-HIB™ 3169 Corrosion Inhibitor Controls High Tem/High Velocity Gas Wells"; pp. 1-2; BJ Chemical Services, Houston, TX.
BJ Chemical Services; "TECHNI-HIB™ 3169 Corrosion Inhibitor Controls High Tem/High Velocity Gas Wells"; pp. 1-2; BJ Chemical Services, Houston, TX, no date.

\* cited by examiner

*Primary Examiner*—George Suchfield
(74) *Attorney, Agent, or Firm*—Jones & Smith, LLP; John Wilson Jones

(57) ABSTRACT

Corrosive effects arising during oilfield treatment applications are inhibited and/or prevented by introducing into an oil or gas well at least one compound of formula I:

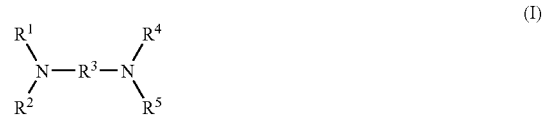

wherein:
$R^1$ is independently H, $-[-C_nH_{2n}O-]_a-H$, or an alkyl group having from 1 to about 24 carbon atoms;
$R^2$ is independently H or $-[-C_nH_{2n}O-]_b-H$,
$R^3$ is independently $-[-CH_2]_c-$, or $-C_{d2d}-[-OC_nH_{2n}-]_e-$,
$R^4$ is independently H or $-[-C_nH_{2n}O-]_f-H$,
$R^5$ is independently H or $-[-C_nH_{2n}O-]_g-H$,
a is from about 1 to about 8;
b+f+g is between 0 to about 30;
c is from about 1 to 6;
d is from about 1 to 6;
e is from about 1 to about 8; and
n is 2 or 3.
Such corrosive effects are especially inhibited in the treatment of sour wells where $H_2S$ corrosion is a potential problem as well as conduits used during the treatment of subterranean formations.

22 Claims, No Drawings

METHOD OF INHIBITING AND/OR PREVENTING CORROSION IN OILFIELD TREATMENT APPLICATIONS

FIELD OF THE INVENTION

The invention relates to methods of inhibiting corrosion of metals in acid environments during oilfield treatment processes.

BACKGROUND OF THE INVENTION

During the production life of an oil or gas well, the production zone within the well is typically subjected to numerous treatments to enhance the lifetime of the well. Corrosion of metallic surfaces during such treatments is a prominent issue, as evidenced by surface pitting, embrittlement and loss of metal. Such metallic surfaces are typically composed of high alloy steels including chrome steels, duplex steels, stainless steels, martensitic alloy steels, ferritic alloy steels, austenitic stainless steels, precipitation-hardened stainless steels and high nickel content steels.

For instance, in such well stimulation techniques as pickling, acid washing, matrix acidizing and acid fracturing, the acidic nature of the treatment fluid causes the production or workover conduits in the well to encounter considerable acidic corrosion.

Further, aqueous fluids, such as those used in drilling and completion, have a high salt content which causes corrosion. Gases, such as carbon dioxide and hydrogen sulfide, also generate highly acidic environments to which metallic surfaces become exposed. For instance, corrosion effects from brine and hydrogen sulfide are seen in flow lines during the processing of gas streams. The presence of methanol, often added to such streams to prevent the formation of undesirable hydrates, further often increases the corrosion tendencies of metallic surfaces.

Further, naturally occurring and synthetic gases are often conditioned by treatment with absorbing acidic gases, carbon dioxide, hydrogen sulfide and hydrogen cyanide. Degradation of the absorbent and acidic components as well as the generation of by-products (from reaction of the acidic components with the absorbent) results in corrosion of metallic surfaces.

It is fairly common during such oilfield treatment processes to use a corrosion inhibitor to inhibit or prevent the corrosion of metallic surfaces, especially in acidic environments. Many conventional corrosion inhibitors used to reduce the rate of acid attack on metallic surfaces and to protect the tubular goods of the wellbore are becoming unacceptable in oilfield treatment processes. For instance, methanol has been found to deactivate many conventional corrosion inhibitors. In addition, many conventional corrosion inhibitors have become unacceptable due to environmental protections measures that have been undertaken.

There remains a need therefore for new, stable corrosion inhibitors which are effective for a wide variety of metallic surfaces.

SUMMARY OF THE INVENTION

Corrosion inhibition and/or prevention in oilfield treatment applications proceeds by introducing into the gas or oil well being treated a nitrogenous compound of the formula:

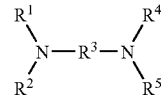

wherein:
$R^1$ is independently H, $-[-C_nH_{2n}O-]_a-H$, or an alkyl group having from 1 to about 24 carbon atoms;
$R^2$ is independently H or $-[-C_nH_{2n}O-]_b-H$,
$R^3$ is independently $-[-CH_2]_c-$, or $-C_dH_{2d}-[-OC_nH_{2n}-]_e-$,
$R^4$ is independently H or $-[-C_nH_{2n}O-]_f-H$,
$R^5$ is independently H or $-[-C_nH_{2n}O-]_g-H$,
a is from about 1 to about 8;
b+f+g is between from 0 to about 30;
c is from about 1 to 6;
d is from about 1 to 6;
e is from about 1 to about 8 and preferably has an average value between from about 2.6 to about 5.6; and
n is 2 or 3.

Compounds of formula (I) are particularly efficacious in the treatment of conduits i.e. flowlines and pipelines containing produced subterranean formation fluids and subterranean formations, such as during matrix acidizing, acid fracturing, pickling and acid washing, as well as other oilfield treatment applications.

The inhibitors eliminate the attack of aqueous acids on metals and are especially effective in sour wells, where $H_2S$ corrosion is a potential problem, as well as in conduits such as flowlines and pipelines.

DETAILED DESCRIPTION OF THE PREFERRED EMBODIMENTS

Corrosive effects of metal, especially iron and ferrous base metals, may be inhibited or prevented by exposing the metal to at least one nitrogenous compound of the formula:

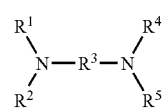

wherein:
$R^1$ is independently H, $-[-C_nH_{2n}O-]_a-H$, or an alkyl group having from 1 to about 24 carbon atoms;
$R^2$ is independently H or $-[-C_nH_{2n}O-]_b-H$,
$R^3$ is independently $-[-CH_2]_c-$, or $-C_dH_{2d}-[-OC_nH_{2n}-]_e$
$R^4$ is independently H or $-[-C_nH_{2n}O-]_f-H$,
$R^5$ is independently H or $-[-C_nH_{2n}O-]_g-H$,
a is from about 1 to about 8;
b+f+g is between from 0 to about 30;
c is from about 1 to 6;
d is from about 1 to 6;
e is from about 1 to about 8, preferably having an average value between from about 2.6 to about 5.6; and
n is 2 or 3.

Compounds of formula (I) are especially effective in the inhibition or prevention of corrosion of metals which are in contact with a liquid medium.

In a preferred embodiment, the compound is of the formula (I), wherein $R^3$ is $-C_dH_{2d}-[-OC_nH_{2n}-]_e$, especially where e is from about 1 to about 8. In a preferred embodiment, a mixture of compounds of formula (I) are employed, wherein e has an average value between from about 2 to about 6.

Further, $R^1$ and $R^2$ are preferably independently selected from an alkyl group having from 1 to about 24 carbon atoms, more preferably wherein $R^1$ and $R^2$ are independently selected from an alkyl group having from 1 to about 6 carbon atoms.

For instance, a preferred nitrogenous compound is one having the formula (I) wherein $R^3$ is $-C_dH_{2d}-[-OC_nH_{2n}-]_e$ and further wherein $R^1$, $R^2$, $R^3$ and $R^4$ are each $-H$; in a particularly preferred embodiment, d is 3.

In a particularly preferred embodiment, the compound of formula (I) is of the structural formula:

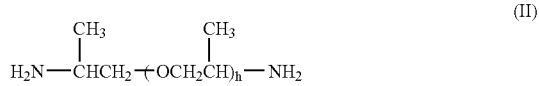
(II)

wherein h is from about 1 to about 8. In a preferred embodiment, a mixture of compounds of formula (II) is employed wherein the average value of h is between from about 2.6 to about 5.6.

In another particularly preferred embodiment, the compound of formula (I) is of the structural formula:

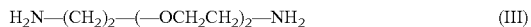
(III)

The nitrogenous compound is especially useful in the treatment of a subterranean formation, such as during acidizing, since the corrosive effect of acid on metal, in the presence of the nitrogenous compound, is greatly minimized. Acid soluble materials may further react with the nitrogenous compound to decrease the corrosive effect imparted by such materials.

The nitrogenous compound is typically introduced as a component of a fluid into the well. The fluid may be water such as fresh water, brackish water, brine as well as salt-containing water solutions such as sodium chloride, potassium chloride and ammonium chloride solutions.

The amount of nitrogenous compound introduced into the well is dependent on the corrosive aqueous acid system, temperature and intended time of contact. The amount of fluid used will vary from well to well and is based upon the particular application at hand. Typically, the treatment fluid contains from about 1,000 ppm, based upon the weight of the treatment fluid, to about 60,000 ppm. When introduced in a fluid, the amount of nitrogenous compound in the fluid is between from about 0.05% to about 5% by volume, more preferably from about 0.1% to about 3%.

The corrosion inhibitors may inhibit or prevent corrosion, caused by aqueous acids, of metal surfaces like iron and steel. The process may be performed by introducing an effective corrosion inhibiting or preventative amount of the nitrogenous compound into a corrosive aqueous acid prior to its introduction into a targeted well. The fluid is typically introduced through a high alloy steel member or conduit positioned within the well.

The acidic injection medium may be composed of any compatible acid, including mineral acids, such as hydrochloric acid, hydrofluoric acid, sulfuric and phosphoric acids as well as weak acids, such as formic acid, acetic acid hydroxyacetic acid and propionic acid as well as mixtures of such acids.

The fluid may further contain one or more solvents, surfactants, mutual solvents, antisludge, sequestering agents, friction reducers, gelling agents, corrosion inhibitor intensifier and other conventional additives as well as mixtures thereof.

Suitable solvents include alkyl alcohols such as methyl alcohol, ethyl alcohol, propyl alcohol, isopropyl alcohol and butyl alcohol and alkylene glycols like ethylene glycol, propylene glycol.

Since the composition dramatically reduces corrosion on metal, the composition can be used in a variety of industrial applications. The use of the corrosion inhibitor is particularly effective in the treatment of wells for enhancement of production of the well such as well stimulation processes like acidizing and fracture acidizing.

Further, the corrosion inhibitors are highly useful in the prevention or inhibition of corrosion attributable to the presence of $H_2S$ in wells (sour gas wells) wherein the presence of $H_2S$ contributes to corrosion along with acidizing acids. The $H_2S$ may be formed when the treating acid contacts a sulfur-containing mineral, such as FeS. In so doing, the inhibitor substantially eliminates the attack of aqueous acids on ferrous metals.

The corrosion inhibitors are further particularly efficacious in the treatment of conduits, i.e. flowlines and pipelines, containing produced subterranean formation fluids and subterranean formations, including liquid and gaseous fluids such as formation produced brines as well as liquid and gaseous hydrocarbons and/or acidic gases like $CO_2$ and $H_2S$. Such fluids may be produced during matrix acidizing, acid fracturing, pickling and acid washing, as well as during other oilfield treatment applications.

The anti-corrosive effects referenced herein may be noted on all metallurgies, including carbon steel and special alloys. Further, the corrosion inhibitors used in the invention do not react with by-products of the acid reaction nor produce detrimental precipitates.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

All parts are given in terms of weight percent unless as otherwise indicated.

Corrosion Inhibitor A ("CI-A") refers to a mixture of compounds of the formula (II) below:

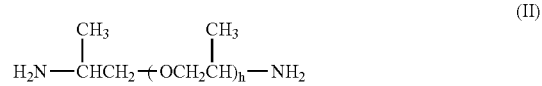
(II)

wherein the average value of h is 2.6.

Corrosion Inhibitor B ("CI-B") refers to the corrosion inhibitor of formula (II) above wherein the average value of h is 5.6.

Corrosion Inhibitor C ("CI-C") refers to a mixture containing ⅔ weight percent of CI-A and ⅓ weight percent of CI-B.

Corrosion Inhibitor D ("CI-D") refers to a commercial inhibitor, available from BJ Services Company of Houston, Tex. as Techni-Hib™ 3804.

Corrosion Inhibitor E ("CI-E") refers to a commercial inhibitor, available from BJ Services Company of Houston, Tex. as Techni-Hib™ 3743.

Examples 1-3

Examples 1-3 demonstrate the corrosion inhibiting effect of CI-C. The tests were conducted in accordance with NACE ID182, wherein the weight loss of 1018 steel coupons was measured. The coupons were submerged in a brine containing 7.33 weight percent NaCl, 0.7539 weight percent $CaCl_2$ and 0.1 weight percent $MgCl_2$ and the designated weight percentage of corrosion inhibitor, the remaining weight percent being water). The brine was then saturated with $CO_2$ and sealed. The bottles were then mounted on a wheel turning continuously for 24 hours at 65° C. (150° F.). The inhibitor efficiency was then calculated from the weight loss data as set forth in Table I:

TABLE I

| Ex. No. | [Corrosion Inhibitor] | Efficiency % |
|---|---|---|
| 1 | 0.01% | None |
| 2 | 0.1% | 12% |
| 3 | 0.3% | 83% |

Examples 4-12

In Examples 4-12, ambient pressure linear polarization resistance (LPR) tests were performed at ambient temperature in 2000 mL glass resin kettles. Corrosion rates were monitored using a linear polarization resistance instrument with 3 electrode probes. Tests were 24-hour exposures of AISI 1018 (UNS G10180) steel electrodes to stirred solutions at room temperature. In all $CO_2$ tests (called sweet conditions), the brines (3% NaCl, 0.3% $CaCl_2 \times 2H_2O$) were $CO_2$ sparged for the duration of the test. For sour condition tests, the brines were also saturated with $CO_2$, 1 g/L of $Na_2S \times 9H_2O$) was added and the kettle was then sealed for the balance of the test. In general, sweet conditions are defined as hydrogen sulfide free while sour conditions are defined when the corrosion environment contains hydrogen sulfide.

Corrosion rates were determined by weight loss of the reference electrode. Electrodes were cylindrical with a surface area of 9 cm². Tests were performed using mixtures of 75% brine and 25% technical grade methanol except in Example 4, which was performed with 100% brine. Methanol was aerated prior to its addition to the brine in Example 5. Various grades of methanol, i.e. reagent quality as well as technical grade solvent obtained from the field, displayed identical performance. Large quantities of methanol are often added to gas and water mixtures to prevent hydrates formation. Due to its good solubility in methanol, oxygen was inadvertently introduced into the system with the solvent creating an oxygen enhanced highly corrosive environment. Measured corrosion rates are set forth in Table II.

TABLE II

| Ex. No. | Corrosion Inhibitor | Conditions | Corrosion, Mils per year (mpy) |
|---|---|---|---|
| 4 | None | 0% MeOH | 73 |
| 5 | None | 25% MeOH/air | 112 |
| 6 | None | 25% MeOH | 44 |
| 7 | 0.3% CI-A | 25% MeOH | 35 |
| 8 | None | 25% MeOH $H_2S$ | 40 |
| 9 | 0.3% CI-A | 25% MeOH $H_2S$ | 1.8 |
| 10 | 1% CI-A | 25% MeOH $H_2S$ | 0.9 |
| 11 | 0.3% CI-B | 25% MeOH $H_2S$ | 1.8 |
| 12 | CI-C [0.2% CI-A and 0.1% CI-B] | 25% MeOH $H_2S$ | 1.7 |

Regardless of conditions, sweet or sour systems displayed extremely high corrosion rates without any corrosion inhibitor, particularly when methanol was saturated with air prior to the testing, as reflected in Examples 4-6 and 8. As shown in Example 7, CI-A offered only mild corrosion protection in the sweet environment. The same class of compounds become an effective corrosion inhibitor in sour systems, as noted in Examples 8-12.

Examples 13-15

Examples 13-15 demonstrate high pressure corrosion testing in sour gas systems. The testing compared a commercial corrosion inhibitor, CI-D, with the compounds used in the invention. The corrosion inhibitors were evaluated at a concentration of 200 ppm by themselves, as well as in the presence of 10% methanol/0.4% CI-C and against 10% CI-D inhibited methanol. The test conditions were as follows:

| | |
|---|---|
| Temperature: | 50° C. (122° F.), ~125 rpm |
| Pressure: | 550 psi (3800 kPa) |
| Gas composition, Mol %: | $CO_2$ 10%, $H_2S$ 22%, $CH_4$ 68% |
| Brine: | 3% total dissolved solids (NaCl) |
| Test duration: | 94 hours |

The brine was charcoal filtered and then purged with $CO_2$ for two hours. The pH was then adjusted to 5.0 with hydrochloric acid. The autoclave cell was constructed of Hastelloy C-276 and had a capacity 300 mL. The tests were performed with 200 mL of brine or approximately two-thirds full. A three-electrode assembly was suspended from the lid of the autoclave, keeping the bottom clear for a Teflon-coated magnetic stir-bar. The configuration of the electrodes was a closely spaced equilateral triangle, with each cylindrical electrode having a 9.5 mm×12.5 mm geometry. The reference electrodes were made from Hastelloy C-276 while the working and counter electrodes were 1018 carbon steel. The electrodes were cleaned and weighted. The quoted surface area of 4.55 cm² was used for the corrosion rate calculations. A thermistor probe held at the center of the cell by a Hastelloy sleeve sensed the temperature of the fluid in the autoclave. Purging and changing the headspace of the autoclave was done by means of an offset Hastelloy tube fitted with a pressure gage and sour-service needle valve. LPR measurements were obtained at 30 minutes intervals by connecting the cell to a PC4-300 potentiostat and controller, via Gamry ECM8 multiplexer. Data acquisition was done by means of Gamry PC105 software package.

For each of the three tests, purged brine (200 mL Example 13, 180 mL for Examples 14 and 15) was placed into an autoclave cell, followed by an injection of 200 ppm (40 µL) of the corrosion inhibitor, CI-D. For Example 14, 20 mL of methanol (purged with $CO_2$ for 10 minutes to remove oxygen) was added making a 10% methanol solution in brine. For Example 15, 20 mL of methanol and CI-A and CI-B were added to 180 mL brine in the autoclave.

After sealing and purging, each cell was pressurized with acid gas composed of 28% $CO_2$, 72% $H_2S$ to 175 psi (1200 kPa) and the pressure was increased to 550 psi (3800 kPa) with methane. The final initial headspace gas composition was 10% $CO_2$, 22% $H_2S$ and 68% $CH_4$ (all gas concentrations are expressed in Mol %). Each test cell was placed inside a heating mantle and brought to 50° C. (122° F.) via proportional temperature controllers (5-10 min). At this point, the Gamry instrument started collecting LPR data for a period of 94 hours.

The gravimetric and visual inspection results obtained from each cell are provided in Table III:

TABLE III

| Example | Cell Fluid | Corrosion, mpy | Visual |
|---|---|---|---|
| 13 | CI-D blank | 0.4 | Minor pitting |
| 14 | CI-D/MeOH | 5.0 | Severe pitting |
| 15 | CI-D/MeOH/CI-A + CI-B | 0.3 | Minor pitting |

The results indicate a standard commercial corrosion inhibitor doesn't perform in the presence of methanol, leading to a significant potential damage of tubular iron and equipment. Addition of a mixture of CI-A and CI-B can compensate for an inferior corrosion inhibitor in the presence of methanol.

Examples 16-22

Examples 16-22 are directed to autoclave corrosion testing at super sour conditions. Machine milled, single sided C1018 steel disks were submerged in an autoclave containing the test solution and pressurized with $CO_2$ and $H_2S$ mixtures. The disks were pre-corroded for 12 hours in the test solution without the sour gases. The test conditions were as follows:

| | |
|---|---|
| Temperature: | 35° C. (95° F.), stirring at 120 rpm |
| Pressure: | 241 psi (1660 kPa) |
| Gas composition: | 16 mol % $CO_2$, 84 mol % $H_2S$ |
| Brine: | Deionized water, purged with $N_2$ for 1 hour |
| Test duration: | 12 hours pre-corrosion + 6 days |

After completion of each test, the weight loss and pitting of the disks was calculated in mpy. Results are presented in Table IV below.

TABLE IV

| Experiment Number | Composition | Corrosion mpy | Pitting mpy |
|---|---|---|---|
| 16 | Deionized water | 17.4 | 0 |
| 17 | 66% MeOH | 12.8 | 461 |
| 18 | 66% MeOH, 0.25% CI-E | 3.6 | 78.8 |
| 19 | 40% MeOH, + 0.3% CI-C | 7.6 | 0 |
| 20 | 40% MeOH, 0.25% CI-E + 0.3% CI-C | 8.2 | 0 |
| 21 | 10% MeOH, + 0.3% CI-C | 8.3 | 0 |
| 22 | 10% MeOH, 0.25% CI-E + 0.3% CI-C | 7.5 | 0 |

At high hydrogen sulfide concentration in the gas phase, large concentrations of methanol result in severe pitting of steel—unacceptable in the field environment. Even a large dosage of commercial corrosion inhibitor lowered the overall corrosion rate but did not prevent pitting (Examples 17 and 18). Corrosion inhibitor CI-C dramatically lowered corrosion rates and eliminated pitting. For instance, corrosion rates with or without inhibitor CI-E are almost the same. CI-E can be eliminated without affecting iron corrosion (Examples 18-22).

What is claimed is:

1. A method of treating a gas or oil well containing gases created from carbon dioxide and hydrogen sulfide in order to reduce corrosion in the gas or oil well which comprises introducing into the gas or oil well a corrosive inhibiting effective amount of at least one compound of the formula:

(I)

wherein:
$R^1$ is independently H, $-[-C_nH_{2n}O-]_a-H$, or an alkyl group having from 1 about 24 carbon atoms;
$R^2$ is independently H or $-[-C_nH_{2n}O-]_b-H$, or an alkyl group having from 1 to about 24 carbon atoms;
$R^3$ is independently $-C_dH_{2d}-[-OC_nH_{2n}-]_e-$,
$R^4$ is independently H or $-[-C_nH_{2n}O-]_f-H$,
$R^5$ is independently H or $-[-C_nH_{2n}O-]_g-H$,
a is from about 1 to about 8;
b+f+g is between 0 to about 30;
d is from about 1 to 6;
e is from about 1 to about 8; and
n is 2 or 3 for a time sufficient to inhibit corrosion of the iron and ferrous base materials by the acid created from hydrogen sulfide and carbon dioxide.

2. The method of claim 1, wherein $R^1$ and $R^2$ are independently selected from an alkyl group having from 1 to about 24 carbon atoms.

3. The method of claim 2, wherein $R^1$ and $R^2$ are independently selected from an alkyl group having between from about 1 to about 6 carbon atoms.

4. The method of claim 1, wherein $R^1$, $R^2$, $R^4$ and $R^5$ are each —H.

5. The method of claim 4, wherein d is 3.

6. The method of claim 4, wherein the compound of formula (I) is:

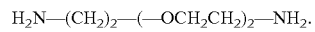

7. The method of claim 1, wherein the compound of formula (I) is:

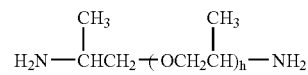

wherein the average value of h is between from about 2.6 to about 5.6.

8. A method of treating an oil or gas well comprising treating the well with an acid and further introducing into the well at least one compound of the formula:

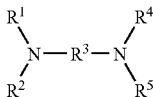

wherein:
R$^1$ is independently H, —[—C$_n$H$_{2n}$O—]$_a$—H, or an alkyl group having from 1 to about 24 carbon atoms;
R$^2$ is independently H or —[—C$_n$H$_{2n}$O—]$_b$—H, or an alkyl group having from 1 to about 24 carbon atoms;
R$^3$ is C$_d$H$_{2d}$—[—OC$_n$H$_{2n}$—]$_e$—,
R$^4$ is independently H or —[—C$_n$H$_{2n}$O—]$_f$—H,
R$^5$ is independently H or —[—C$_n$H$_{2n}$O—]$_g$—H,
a is from about 1 to about 8;
b+f+g is between 0 to about 30;
d is from about 1 to 6;
e is from about 1 to about 8; and
n is 2 or 3
wherein the amount of compound of formula (I) introduced into the well is an amount sufficient to prevent and/or inhibit corrosion in the well.

9. The method of claim 8, wherein R$^1$ and R$^2$ are independently selected from an alkyl group having from 1 to about 24 carbon atoms.

10. The method of claim 9, wherein R$^1$ and R$^2$ are independently selected from an alkyl group having between from about 1 to about 6 carbon atoms.

11. The method of claim 8, wherein R$^1$, R$^2$, R$^4$ and R$^5$ are each —H.

12. The method of claim 8, wherein the compound of formula (I) is selected from the group consisting of:

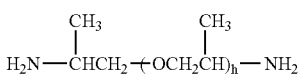

wherein the average value of h is between from about 2.6 to about 5.6; and (b) H$_2$N—(CH$_2$)$_2$—(—OCH$_2$CH$_2$—)$_2$NH$_2$.

13. The method of claim 8, wherein the corrosion inhibitor is introduced into the well during stimulation.

14. The method of claim 13, wherein the corrosion inhibitor is introduced into the well during matrix acidizing or acid fracturing.

15. The method of claim 8, wherein a fluid containing the corrosion inhibitor and a corrosive aqueous acid is introduced into the well.

16. A method of treating an oil or gas well in order to reduce corrosion in the well which comprises introducing into the oil or gas well a corrosion inhibiting effective amount of:
  (a) a mixtures of compounds of the formula:

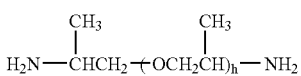

wherein the average value of h is between from about 2.6 to about 5.6; and/or (b) H$_2$N—(CH$_2$)$_2$—(—OCH$_2$CH$_2$—)$_2$—NH$_2$.

17. A method of inhibiting corrosion during the treatment of a subterranean formation which comprises introducing into a gas or oil well an aqueous acid fluid comprising an acid and a corrosive inhibiting effective amount of at least one compound of the formula:

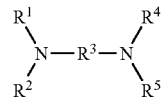

wherein:
R$^1$ is independently H, —[—C$_n$H$_{2n}$O—]$_a$—H, or an alkyl group having from 1 to about 24 carbon atoms;
R$^2$ is independently H or —[—C$_n$H$_{2n}$O—]$_b$—H, or an alkyl group having from 1 to about 24 carbon atoms;
R$^3$ is —C$_d$H$_{2d}$—[—OC$_n$H$_{2n}$—]$_e$—,
R$^4$ is independently H or —[—C$_n$H$_{2n}$O—]$_f$—H,
R$^5$ is independently H or —[—C$_n$H$_{2n}$O—]$_g$—H,
a is from about 1 to about 8;
b+f+g is between 0 to about 30;
d is from about 1 to 6;
e is from about 1 to about 8; and
n is 2 or 3
for a time sufficient to inhibit corrosion of the iron and ferrous base materials.

18. The method of claim 17, wherein the acid of the aqueous fluid is a mineral acid or a weak organic acid.

19. The method of claim 18, wherein the acid of the aqueous fluid is selected from the group consisting of hydrochloric acid, hydrofluoric acid, sulfuric acid, phosphoric acid, formic acid, acetic acid, hydroxyacetic acid and propionic acid and mixtures thereof.

20. The method of claim 17, wherein R$^1$ is [—C$_n$H$_{2n}$O—]$_a$—H and R$^2$ is independently —H or —[—C$_n$H$_{2n}$O—]$_b$—H.

21. The method of claim 20, wherein the compound of formula (I) is:

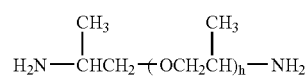

wherein the average value of h is between from about 2.6 to about 5.6.

22. A method of treating an oil or gas well comprising treating the well with an acid and further introducing into the well at least one compound of the formula:

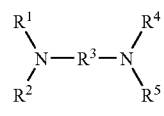

wherein:
R$^1$ is —[—C$_n$H$_{2n}$O—]$_a$—H;
R$^2$ is independently H or —[—C$_n$H$_{2n}$O—]$_b$—H,
R$^3$ is —C$_d$H$_{2d}$—[—OC$_n$H$_{2n}$—]$_e$—,
R$^4$ is independently H or —[—C$_n$H$_{2n}$O—]$_f$—H,
R$^5$ is independently H or —[—C$_n$H$_{2n}$O—]$_g$—H,
a is from about 1 to about 8;

b+f+g is between 0 to about 30;
d is from about 1 to 6;
e is from about 1 to about 8; and
n is 2 or 3 wherein the amount of compound of formula (I) introduced into the well is an amount sufficient to prevent and/or inhibit corrosion attributable to the presence of $H_2S$ in the well.

* * * * *

UNITED STATES PATENT AND TRADEMARK OFFICE
CERTIFICATE OF CORRECTION

PATENT NO. : 7,481,276 B2  Page 1 of 1
APPLICATION NO. : 11/433380
DATED : January 27, 2009
INVENTOR(S) : Ronald L. Hoppe et al.

It is certified that error appears in the above-identified patent and that said Letters Patent is hereby corrected as shown below:

On the title page, item [75] in the Inventors section, replace "Thame D. Schaffer" with "Thane D. Schaffer".

Signed and Sealed this

Ninth Day of June, 2009

JOHN DOLL
*Acting Director of the United States Patent and Trademark Office*